H. D. PETERS.
HEADLIGHT OPERATING DEVICE.
APPLICATION FILED AUG. 11, 1911.
1,037,047.
Patented Aug. 27, 1912.
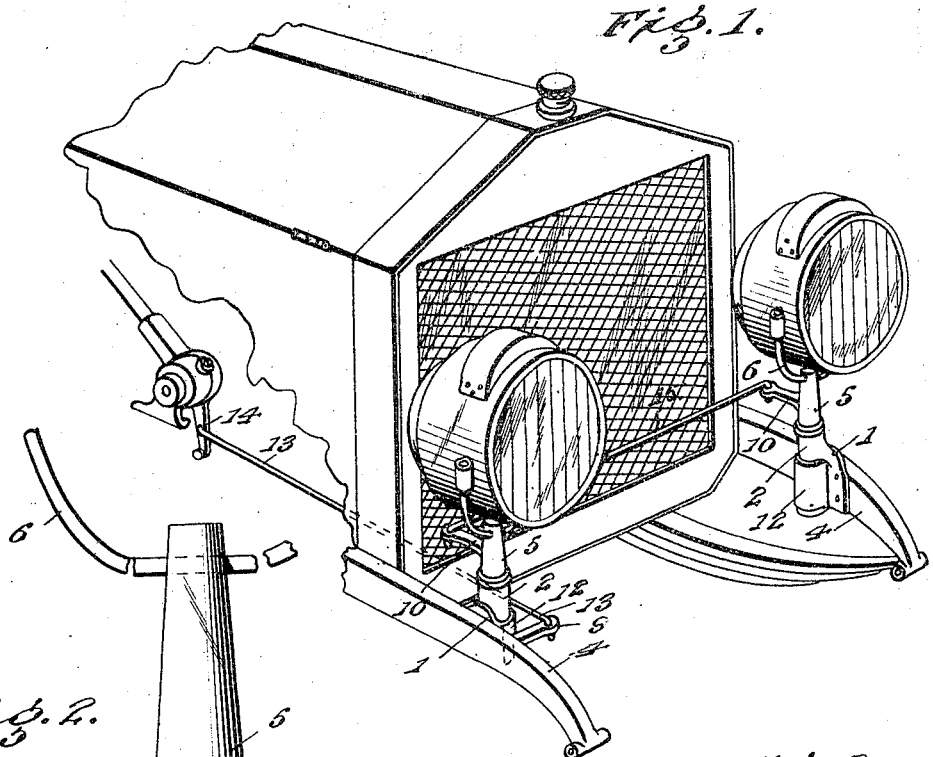
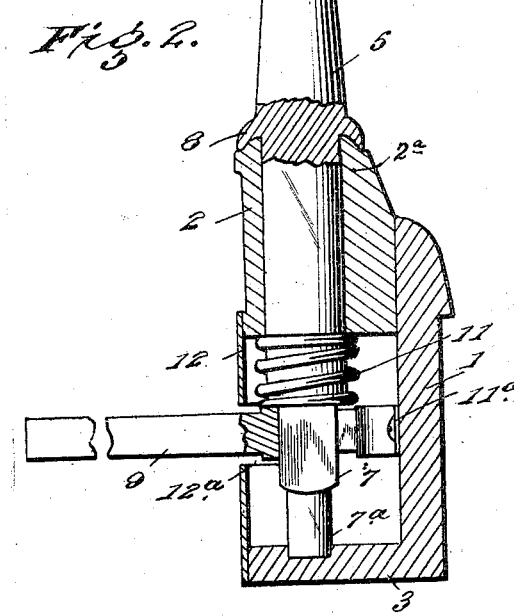
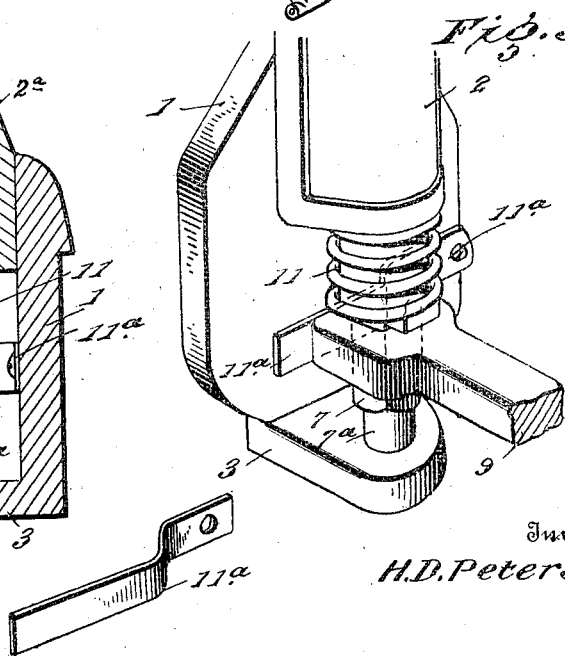
Inventor
H.D. Peters

UNITED STATES PATENT OFFICE.

HOLIDAY D. PETERS, OF SIOUX FALLS, SOUTH DAKOTA.

HEADLIGHT-OPERATING DEVICE.

1,037,047.

Specification of Letters Patent. Patented Aug. 27, 1912.

Application filed August 11, 1911. Serial No. 643,599.

*To all whom it may concern:*

Be it known that I, HOLIDAY D. PETERS, citizen of the United States, residing at Sioux Falls, in the county of Minnehaha and State of South Dakota, have invented certain new and useful Improvements in Headlight-Operating Devices, of which the following is a specification.

This invention comprehends certain new and useful improvements in automobile attachments or accessories, and relates particularly to devices for turning the headlights of an automobile either to the right or to the left as desired, under the control of the steering mechanism, as the vehicle rounds curves in order that the beams of light may be thrown directly in advance of the vehicle.

The invention has for its primary object a simple, durable and efficient construction of an automobile headlight turning device which may be easily manufactured and susceptible of easy attachment to the framework of an automobile.

The invention has for a further object a device of this character the construction of which allows for automatically compensating for the wear within the mechanism, thus insuring a quietly operating device.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawing, in which:

Figure 1 shows my improved light turning device attached to an automobile; Fig. 2 shows a vertical section of the lamp supporting bracket; Fig. 3 shows a perspective view of said bracket with the casing removed; and Fig. 4 shows the angular flat spring of the device.

Corresponding and like parts are referred to in the following description and indicated in all the views of the accompanying drawing by the same reference characters.

My improved device includes a supporting bracket embodying a vertically disposed face, designated by the numeral 1, a socket 2 the upper part of which is formed with a tapering extremity $2^a$, and an angularly extending base 3, said bracket being detachably mounted to the frame 4 of the automobile. A vertically disposed post 5, provided at its upper end with the usual lamp supporting arms 6 and near its lower end constructed with a square shoulder 7, is journaled in the socket 2 and has its lower cylindrical extremity $7^a$ journaled in the base 3. The post 5 is provided with a flange or collar 8 the internal surface of which is beveled to fit over the tapered end of the socket 2, which construction insures a tight fit between the parts and prevents the entrance of dirt and the like. A horizontally disposed arm 9 is detachably mounted on the square shoulder 7 of the post 5 and secured thereto preferably by a pin.

A horizontally disposed arm 10 is rigidly attached to the post 5 at a point intermediate the lamp supporting arms 6 and the collar 8 and at right angles to the arm 9, said arm 10 forming a connection to the other lamp bracket, whereby motion is transmitted to the same. A downward tension is at all times maintained on the post 5 through a coiled spring 11 which encircles said post and bears at its ends against the lower wall of the socket 2 and the arm 9, thereby tending to draw down on the post 5 and hold the collar 8 in engagement with the tapered end of the socket 2 about which it is designed to fit.

Acting at a right angle to the coiled spring 11 is an angular flat spring $11^a$ mounted horizontally on the vertical face 1 of the supporting bracket and bearing with its free end against the square butt end of the arm 9, the surface of said spring being normally parallel thereto and in its action tending to maintain the arm 9 at a right angle to the face of said spring, in which position the vehicle lamps are caused to face straight ahead. A casing 12, formed as to closely inclose the space intermediate the socket 2, base 3 and face 1, is detachably connected to said face and is also provided with a segmental slot $12^a$ throug' which the arm 9 operates. This casing could of course be constructed integral with the lamp bracket, but when detachable as in the present construction ready access to the working parts of the device is allowed and the latter may be easily dismantled when desired.

The arm 9 is preferably pivotally connected by means of a rod 13 to a steering arm 14 of the automobile steering gear and derives its motion therefrom. It is to be understood of course that the construction is not limited to this method of connecting the arm 9 to the steering arm 14, as the same would be determined by the type of automobile to which the device is to be attached.

From the foregoing description in connection with the accompanying drawing, the operation of my improved headlight turning device will be apparent.

When the steering arm 14 is moved in steering the automobile, the rod 13 is correspondingly actuated, either moving forward or backward as the automobile is steered to the right or to the left. The rod 13 being pivotally connected to the arm 9 causes the post 5 to which said arm is attached to rotate, thus turning the lamp mounted at the top of the post 5 either to the right or to the left as the case may be. It is of course to be understood that the arm 10 is pivotally attached by a rod 15 to a similar arm on the other lamp bracket, thereby affording a means of operating the two lamps in unison, as when the actuating bracket is turned, the other bracket, being pivotally connected, is turned in a corresponding direction.

The coiled spring 11 mounted between the socket 2 and the arm 9 on the post 5 tends to draw down on said post, thereby holding the collar 8 in engagement with the tapered end of the socket 2 about which it closely fits. Should the bracket become worn in operation, the action of this spring will compensate for said wear, thus insuring a quietly operating device.

The flat spring 11ª which engages the rectangular end of the arm 9 tends to retain said arm in a position at a right angle to the working face of the spring, so that if the connections between the steering device and the lamp become worn and lost motion results, thus allowing the vehicle wheels to turn independently of the lamp bracket, said spring tends to hold the post 5 in a fixed position and thus maintaining the lamps in a straight ahead position during slight turns of the vehicle wheels.

It will here be noted that the attaching face 1 of the bracket is provided with an angularly disposed base 3 spaced from the lower end of the socket 2 and provided with a bearing adapted to receive the lower end of the lamp carrying post 5, thus affording two bearings for the post and providing a chamber between the bearings in which the operating mechanism is disposed. This chamber and the parts contained therein is entirely housed and protected by the detachable casing 12 secured to the face 1, thus completing a device neat and compact in appearance, and simple, durable and efficient in its operation.

Having thus described the invention what is claimed as new is:

1. A headlight turning device including a bracket having an attaching member, and provided with a socket having a tapered upper extremity forming a bearing, a lamp carrying post journaled in said socket and provided with an overhanging flange engaging the bearing of the socket, and means encircling the post below the socket and tending to normally and yieldably hold the flange in contact with the bearing.

2. A headlight turning device including an attaching member having an angularly disposed base extending therefrom, the inner face of which is provided with a bearing, a socket carried by said member and spaced from the base to form an internal chamber, a lamp carrying post mounted in the socket and extending through the chamber for engagement with the bearing in the base, said post being provided with an overhanging flange adapted to engage the upper end of the socket, and means disposed within the chamber and encircling the post for normally and yieldably holding said flange in engagement with the socket.

3. A headlight turning device including an attaching member having an angularly disposed base extending therefrom, the inner face of the base being provided with a bearing, a socket carried by said member and spaced from the base to form an internal chamber, a lamp carrying post mounted in the socket, extending through the chamber and engaging the bearing in the base, said post being provided with an overhanging flange adapted to engage the upper end of the socket, means disposed within the chamber and encircling the post for normally and yieldably holding said flange in engagement with the socket, and a casing detachably secured to the attaching member and inclosing the chamber.

4. A headlight turning device embodying an attaching member having a socket, a slotted casing connecting the socket and base of the attaching member and defining an intermediate chamber, a lamp carrying post mounted in the socket and passing through said chamber, a portion of the post within the chamber being angular in cross section, an arm extending through the slot in the casing and engaging the angular portion of the post, a spring encircling the post and bearing against the lower end of the socket and the adjacent portion of the operating arm, and a second spring secured to the attaching member and bearing with its free end against the inner end of the operating arm.

In testimony whereof, I affix my signature in presence of two witnesses.

HOLIDAY D. PETERS. [L. S.]

Witnesses:
ALMA KIRKEBY,
O. A. HAYWARD.

Copies of this patent may be obtained for five cents each, by addressing the "Commissioner of Patents, Washington, D. C."